(12) United States Patent
Rychlak

(10) Patent No.: US 6,477,462 B1
(45) Date of Patent: Nov. 5, 2002

(54) TRANSFER LOCATION NAVIGATION METHOD AND ARRANGEMENT

(75) Inventor: Stefan Rychlak, Ilsede (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/626,944

(22) Filed: Jul. 27, 2000

(30) Foreign Application Priority Data

Jul. 29, 1999 (DE) .......................... 199 35 645

(51) Int. Cl.[7] .............................. G06F 7/00; G08G 1/123
(52) U.S. Cl. ...................... 701/210; 340/994; 701/302
(58) Field of Search ................. 701/201, 204, 701/208–211, 300, 302; 340/988, 990, 993, 994, 995, 905

(56) References Cited

U.S. PATENT DOCUMENTS

| | | | | |
|---|---|---|---|---|
| 5,765,122 A | * | 6/1998 | Nagai et al. | 701/208 |
| 6,163,748 A | * | 12/2000 | Guenther | 701/202 |
| 6,195,022 B1 | * | 2/2001 | Yamakita | 340/988 |
| 6,240,362 B1 | * | 5/2001 | Gaspard, II | 701/209 |

FOREIGN PATENT DOCUMENTS

| | | |
|---|---|---|
| DE | 195 21 929 A1 | 4/1996 |
| EP | 0 712 106 A2 | 5/1996 |

OTHER PUBLICATIONS

Patent Abstract of Japan, vol. 1998, No. 11, Sep. 30, 1998 & JP 10 170288 A, Jun. 26, 1998.

* cited by examiner

Primary Examiner—William A. Cuchlinski, Jr.
Assistant Examiner—Edward Pipala
(74) Attorney, Agent, or Firm—Michael J. Striker

(57) ABSTRACT

A drive of a primary transportation means is navigated by a navigation device along a calculated route from a starting point to a destination by the device issuing appropriate travel advice, in that a transfer location from the primary transportation means to a secondary transportation means traveling to an ultimate destination is selected for the above destination, and additional information is produced in dependence on known departure times and destinations of various ones of the secondary transportation means for use in at least one of bringing such additional information to the driver's attention and calculating the route.

19 Claims, 2 Drawing Sheets

TRANSFER LOCATION NAVIGATION METHOD AND ARRANGEMENT

BACKGROUND OF THE INVENTION

1. Field of the Invention

The present invention relates to vehicle navigation in general, and more particularly to a method and an arrangement for guiding the driver of the vehicle in traveling along a calculated route from a starting point to a destination.

2. Description of the Related Art

There are already known various constructions of navigation arrangement, and associated navigation methods, for use in guiding a driver of a motor vehicle in negotiating a route from a starting to a finishing point, among them such that are capable of selecting the very route to be traveled in dependence on various given or chosen parameters, by means of travel advice or instructions of optical and/or acoustic nature that informs the vehicle driver about the action to be taken by him or her if the desire is to follow the pre-selected route. Nowadays, many a navigation device of this type is even capable of being updated by information received from a remote location, even while the vehicle is already en route to the originally selected destination, and of changing the route, if need be, on the basis of such an updated information.

A conventional navigation device of this kind could be used to guide a vehicle driver from a starting point to a transfer location at which the driver of (or a passenger in) the vehicle would transfer from the vehicle originally used—hereafter referred to as a primary transportation means—to another (secondary) transportation means that would then take him or her to the desired ultimate destination. However, for the conventional navigation device to be usable in this manner, the coordinates of the transfer location, rather than those of the ultimate destination, would have to be entered, and provisions would have to be made separately prior to the departure from the starting point to assure timely arrival of the primary transportation means at the transfer location.

OBJECTS OF THE INVENTION

Accordingly, it is a general object of the present invention to avoid the disadvantages of the prior art.

More particularly, it is an object of the present invention to provide a vehicle navigation method that does not possess the drawbacks of the known methods of this type.

Still another object of the present invention is to devise a method of the type here under consideration that would make it possible to select the route to be traveled on the basis of the ultimate destination rather than on local considerations.

It is yet another object of the present invention to design a navigation device for performing the above method in such a manner as to automatically guide the vehicle driver for travel along a route that would result in the most advantageous trip at that time to the ultimate destination to be reached by a secondary transportation means.

A concomitant object of the present invention is so to construct the navigation arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a method of navigating a driver of a primary transportation means along a calculated route from a starting point to a destination by issuing appropriate travel advice. This method includes the steps selecting for the aforementioned destination a transfer location from the primary transportation means to a secondary transportation means traveling to an ultimate destination; and producing additional information, in addition to the travel advice, in dependence on known departure times and destinations of various ones of the secondary transportation means for use in at least one of bringing such additional information to the driver's attention and calculating the route.

A particular advantage of this inventive approach is that the primary transportation means driver is made aware in a timely fashion, that is already during the travel of the primary transportation means from the original or subsequent point of departure of the latter to the transfer location at which a transfer is to take place from the primary transportation means (e.g. a personal passenger car) to a secondary transportation means (e.g. an express train) of information or advice concerning the next reachable or the quickest secondary transportation means going from a particular transfer location to the ultimate destination. In the alternative or in addition, the produced information can be automatically taken into account, in the sense of optimization of the overall travel from the staring point to the ultimate destination, for instance with respect to the travel time, already during the route determination or calculation, that is for instance in the selection of the transfer location for the secondary transportation means. Finally, it is of advantage that the entire trip including the utilization of the secondary transportation means can be optimized as a whole, for instance with respect to the minimization of the travel time. In this respect, it is particularly advantageous when, in accordance with the present invention, the producing step includes determining the information in dependence on the ultimate destination entered by the driver. This means that it is the ultimate destination and the convenience of reaching it that is determinative of the secondary transportation means and hence, in the final analysis, the transfer location, rather than the other way around, which accrues to the benefit of the traveler.

According to a particularly advantageous feature of the present invention, the producing step includes generating an indication of the time available before the departure of the particular secondary transportation means from at least one of the present location of the primary transportation means and the prospective time or arrival of the primary transportation means at the transfer location. An advantage of this feature is that the traveler is apprised in a timely fashion of the prospective arrival time at the transfer location and/or the time reserve available at that point between the prospective time of arrival of the primary transportation means at, and the departure of the secondary transportation means from, the transfer point. This makes it possible for the traveler to arrange, in the event that the available time reserve is large enough to permit it, for incorporation of intermediate stops on the way of the primary transportation means to the transfer location, for instance to take care of official business, attend to some shopping, or the like. In this context, it is particularly advantageous when the time reserve is given as a difference between the prospective time of arrival of the primary transportation means at the transfer location as calculated at that time, and the departure of the secondary transportation means from the transfer location. This facilitates the estimation of that part of the time reserve that is available for spending on unpredictable hindrances, such as detours, traffic jams or stoppages on the way to the transfer point.

In conjunction with this, it is particularly advantageous when the time reserve between the prospective arrival of the primary transportation means at the transfer point and the departure of the secondary transportation means therefrom, as it is calculated and presented to the primary transportation means driver, takes into account the traffic conditions the encountering of which is actually to be expected, such as the then know traffic jams or slowdowns or the like. The information concerning such actual traffic conditions can be delivered to the navigation device with which the primary transportation means is equipped, for instance, via a radio transmission.

A further advantageous aspect of the present invention is to be seen in the fact that the generating step includes issuing, in the event that said available time indication drops below a predetermined threshold such as, say, 10 minutes, another indication of the time available before the departure of the next following secondary transportation means instead of the originally calculated time reserve. In this manner, it is avoided that the driver, considering the low level of the available time reserve, would switch over to an aggressive driving behavior in order to reach the secondary transportation means notwithstanding. Therefore, this aspect of the present invention contributes to overall traffic safety.

According to another particularly advantageous facet of the invention, the selecting step includes using the additional information obtained in the producing step as to the departure times of the various kinds of secondary transportation means and their destinations for determining the travel route to that of all possible transfer locations from which the secondary transportation means that arrives at the ultimate destination the soonest departs. This renders possible an optimization of the trip in terms of minimization of the overall travel time from the starting point to the ultimate destination. In particular, it is possible under certain circumstances, when pursuing this facet of the invention, to reroute the primary transportation means in the event that it is determined that it would not arrive at a certain transfer point to a chosen secondary transportation means timely or with a sufficient time reserve for an orderly transfer, so that it would reach another transfer point to that very same secondary transportation means in time and with a sufficient time reserve to accomplish such a transfer.

It is advantageous when the producing step includes retrieving departure times and ultimate destinations of the secondary transportation means from a storage. However, it is even more advantageous for the producing step to include, in accordance with the present invention, obtaining departure times and ultimate destinations of the secondary transportation means in an updated form from a data base over a wireless connection. This renders it possible, for instance, to react in the determination of the route to be taken to delays or cancellations of the secondary transportation means. In this way, the navigation device may be able to inform the driver of the primary transportation means that he or she would still be able to arrive at the transfer point with a sufficient time reserve to catch a delayed secondary transportation means where the time reserve would be insufficient were the secondary transportation means to arrive and depart as scheduled.

The present invention is also directed to an arrangement for navigating a driver of a primary transportation means along a calculated route from a starting point to a destination by issuing appropriate travel advice. This arrangement, which possess the advantages enumerated above, includes means for storing departure times from transfer locations from the primary transportation means to a secondary transportation means, and ultimate destinations to which such secondary transportation means travel; navigation computing means for producing additional information, in addition to said travel advice, in dependence on such stored departure times and ultimate destinations of various ones of the secondary transportation means for use in at least one of bringing such additional information to the driver's attention and calculating the route. For the reasons listed above, it is advantageous when the arrangement is further equipped with means for receiving updated information from a remote location about the currently applicable ones of said departure times and ultimate destinations; and means for storing such updated information for use by said navigation computing means.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
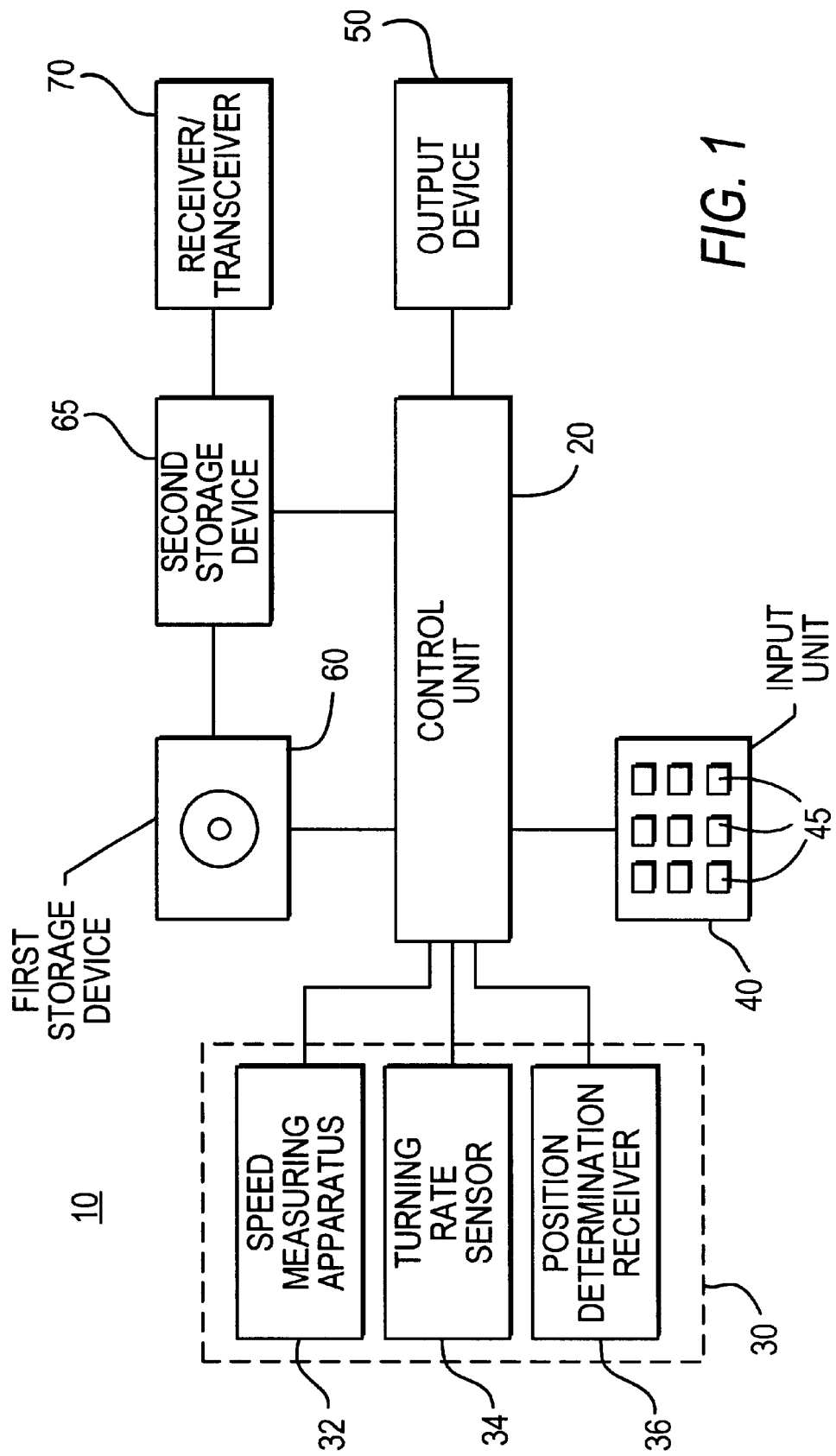
FIG. 1 of the drawings is a simplified block diagram of that part of a navigation device that is of significance in the context of the present invention.
Figure 2:
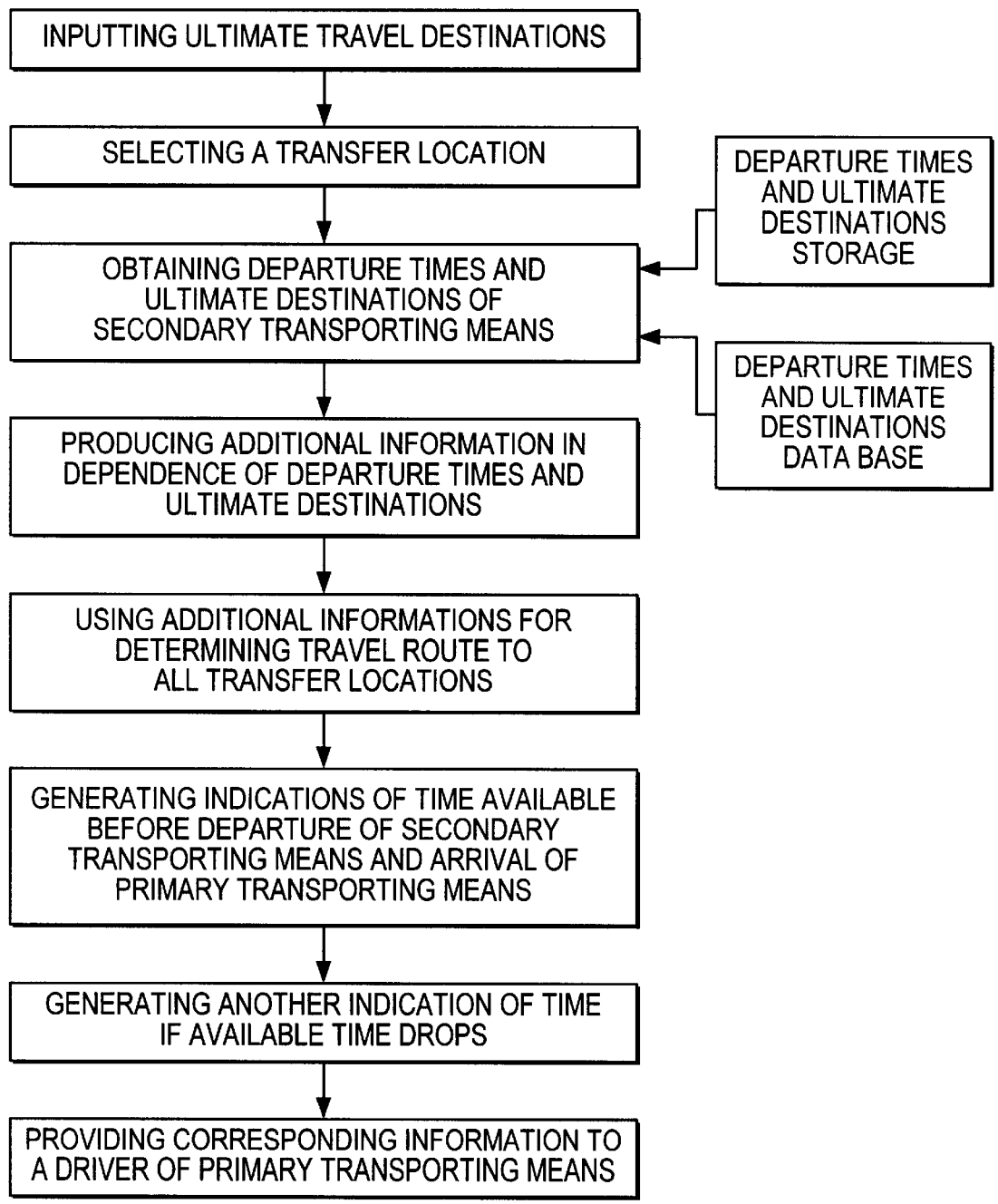
FIG. 2 is a view showing a flow chart illustrating an operation of the navigation device in accordance with the present invention.

Referring now to the sole Figure of the drawing in detail, it may be seen that the reference numeral 10 has been used therein to identify a navigation device in its entirety. The navigation device 10 includes a control unit 20 which, in turn, includes the actual navigation computer of the navigation device 10. The control unit 20 preferably incorporates an operating program that is run by a microprocessor or the like, all in a manner well known in the art.

To the control unit 20, there are connected means 30 for the determination of the actual momentary position or location of the vehicle in which the navigation device 10 is installed or carried and to be operated, as well as the motion status of the vehicle. In particular, such means 30 may include, as illustrated, a speed measuring apparatus 32, a turning rate sensor 34, and a position determination radio receiver 36. The speed measuring apparatus 32 issues an output signal indicative of the actual speed of the vehicle based, for instance, on the number of signals or pulses issued per second by wheel sensors of an ABS (anti-block system) and on the known outer circumference of the vehicle tire in question. This data may then also be used, for instance either by integration of the speed signal over time, or by the coupling of the absolute number of the pulses derived from the wheel sensors with the known tire circumference, for the determination of the distance traveled by the vehicle since the commencement of the particular trip or segment thereof. The turning rate sensor 34 determines from a turning date change a corresponding change of the orientation of the vehicle with respect to a particular point of the compass, or, by integration of the turning rate change over time, the momentary orientation of the vehicle, that is the actual direction in which it is headed at that particular time. Furthermore, the receiver 36 is operative for receiving and processing signals indicative of the actual position of the vehicle, especially the satellite signals of the GPS (Global Positioning System), making it possible to obtain additional indication of the actual instantaneous position of the vehicle.

Furthermore, an input unit 40 including actuating elements 45 is connected to the control unit 20. This input unit 40 serves for operating the navigation device 10, among other for the entry of a navigation destination and/or an intermediate travel target. Herein, the input of the navigation destination or target is accomplished, for instance, by a letter-by-letter entry of the locale name of the navigation destination and/or by the selection of the navigation destination from a stored list.

Moreover, an output device 50 is connected to the control unit 20. This output device 50 serves for issuance of optical and/or acoustical of driving advice, for instance in the form of "at the next intersection, turn right". This output device 50 also serves, in the situation considered here, for the issuance of additional information, especially, for example, the indication of a time reserve available between the prospective arrival of the vehicle equipped with the navigation device 10 (referred to herein as "primary transportation means") at the departure location of a secondary means of transportation and the scheduled or presumed actual departure of such secondary transportation means.

For the determination and/or calculation of the driving route of the primary transportation means from a starting point or from any actual or instantaneous location of such primary transportation means to a final or intermediate destination, the navigation device 10 refers to information from a digitally stored map. To this end, the navigation device 10 is provided with a first storage device 60 that is connected with the control unit 20 and in which the map in question is stored, together with other traffic routing information, especially that concerning the streets that the vehicle is question is permitted to use en route to its chosen destination. This first storage device 60 is advantageously constituted, for example, by a CD-ROM drive, with a pre-recorded CD-ROM disk placed in it as the information carrier medium.

Furthermore, there is provided a second storage device 65 which is also connected with the control unit 20. Departure times and travel destinations of various secondary transportation means are stored in this second storage device. In particular, this second storage device contains the data from the long-distance train schedule, namely the departure times and destinations of all of the long-distance trains from all of the railroad stations in the area of interest, as well as the flight schedules from all of the airports, as well as, possibly, bus schedules and/or train schedules for local or regional service. This second storage unit is advantageously constituted by a rewritable memory or drive and, for updating the data stored therein, it is connected with a radio receiver or transceiver 70, so that, for instance, information about schedule changes or delays or cancellations of the individual secondary transportation means can be transmitted through the thus established radio connection to the second storage unit and stored therein.

The navigation device 10 operates, in accordance with the present invention, as follows:

An ultimate travel destination that the driver and/or the occupant(s) of the primary transportation means wish(es) eventually to reach by using a secondary transportation means, such as for instance train, airplane or bus, after arriving to the departure point of the latter, (which is also referred to here as transfer location) in the primary transportation means is entered through the operating or input unit 40 by actuating the appropriate actuating elements 45 thereof. It is the travel of the primary transportation means to the transfer location, though, that is to be accomplished under the auspices of the navigation device 10.

After the ultimate destination had been entered, the navigation computer that is incorporated in the control unit 20 determines from the signals obtained from the position determination means 30, that is, the speed determination means 32, the turn rate sensor 34, and the GPS receiver 36, the actual or instantaneous location of the vehicle or primary transportation means. The position or vehicle location information as derived from the devices 32, 34 and 36 is preferably compared, for the purpose of error correction, in the sense of plausibility examination, with the data of the stored map.

Subsequently, the aforementioned navigation computer determines a travel route from the instantaneous location of the primary transportation means to the transfer location (point of departure of the respective secondary transportation means).

In an initially assumed (default) case, in which no preconditions are made as to the various secondary transportation means, the fastest connection to the ultimate destination is automatically selected. This means that the navigation computer, referring to the information available in the second storage device 65, such as for instance train, airplane and bus schedules and other relevant information relating thereto, automatically determines that secondary transportation means that is the most advantageous at that time under the boundary condition of the fastest connection or minimum overall travel time, as well as the location of its departure (the transfer location) and calculates the route from the momentary location of the primary transportation means to the thus determined transfer location. So, for instance, if the traveler (be he or she the driver of the primary transportation means or its passenger) wished to travel, in the shortest possible time while using a secondary transportation means for the long-distance leg of the trip, from the vicinity of Stuttgart to Frankfurt/Main in Germany, then the navigation device 10 determines, based on the bus and train information then stored in the second storage device 65 a close station of a short-distance or local train service or the location of a stop of a bus service (either one of which may be available as the initial secondary transportation means) by using which the primary transportation means occupant in question can then travel to the Stuttgart main train station, from where he or she can then continue to travel, after changing from the first secondary transportation means to another, by a long-distance express train to Frankfurt/Main.

During the actual destination navigation process, that is, during the guidance of the primary transportation means along the thus calculated route by means of the routing advice or instructions, the driver of the primary transportation means is made aware, either continuously or at regular intervals, of the time reserve available from the prospective arrival of the primary transportation means at the transfer location to the departure of the respective secondary transportation means from such a location. This time reserve is calculated from the difference between the current time-of-the-day and the scheduled or actual departure time of the secondary transportation means from the transfer location, taken together with the information stored in conjunction with the map data concerning the traveling speeds achievable or permitted on the various road segments of the route to be traveled to the transfer location.

A particularly advantageous feature of the present invention provides, in this context, provides for notifying the driver, should the need for it arise, about the decline of the calculated time reserve between the predicted time of arrival of the primary transportation means at the transfer location and the presumed time of departure of the secondary transportation means therefrom below a predetermined threshold of, for instance, 10 minutes. This decline may come into being, for instance, as a result of encountering an unforeseen, (not existing or yet unannounced at the time of route calculation) traffic jam on the selected route to the intermediate target, that is to the originally chosen transfer location to the selected secondary transportation means, or of an originally unplanned primary transportation means trip interruption. At the same time, the navigation device 10 performs a new route calculation in the manner discussed above. During this new route determination, a different alternative than the originally chosen one may be selected; so, for instance, a different type (e.g. a bus instead of a train) or physical embodiment (e.g. the next train) of the secondary transportation means may be chosen, or a different transfer location to the very same physical embodiment of the secondary transportation means. So, for instance, if it was originally contemplated that the traveler would take, while traveling from a neighborhood in the vicinity of and to the north of Stuttgart to Frankfurt/Main, the primary transportation means to a nearby station of the S-Bahn (city rapid transit) in order to travel from there on the S-Bahn train to the main railroad station in Stuttgart, and i can be predicted that the S-Bahn station cannot be reached with a sufficient time reserve before the S-Bahn train departure, then a new route calculation is triggered. This calculation may come up, for instance, with the result that, instead using the S-Bahn, the traveler should proceed to the long-distance express station Vaihingen/Enz, through which the inter-region trains departing from the Stuttgart main station to Frankfurt/Main pass and make scheduled stops, so that the rerouted traveler may still board the originally chosen fastest train from Stuttgart main station to Frankfurt/Main at Vaihingen/Enz with a sufficient time reserve to make an unhurried transfer. Of course, the fact that the travel distance traveled in the primary transportation means is considerably greater than that originally contemplated must be accepted as a part of the bargain.

A further especially advantageous embodiment of the present invention provides for the route calculation to be performed not on a static basis, but rather dynamically, that is based on continuously updated information. To this end, the navigation device 10 is equipped, as mentioned before, with the radio receiver or transceiver 70 that is connected with the second storage device 65. Through this radio or similar wireless connection, the data contained in the second storage device 65 can be updated by information that is made available for this and/or other purposes by a service provider. In this manner, to give a few examples, announced delays or outright cancellations of particular secondary transportation means, such as train delays or airplane flight cancellations due to inclement weather, can be taken into account when calculating the best route.

However, instead, it can also be provided in accordance with the present invention that, prior to the route calculation for the primary transportation means, a connection is established through the receiver/transceiver 70, for instance a GSM mobile telephone, with an appropriate service provider, and information regarding secondary transportation means schedules and/or similar or related information for the region of interest, for instance the vicinity of Stuttgart, is downloaded from this service provider's data bank and stored in the second storage device 65 for subsequent use in the route calculation. This has the advantages that, on the one hand, constantly or timely updated information is available for the route calculation while, on the other hand, the second storage device 65 need have only a limited capacity.

In a similar manner, it is also possible to take into account during the route determination other relevant information instead of the static map information stored in the first storage device 60, for instance with respect to traffic jams on certain route segments, changed speed limits due to, for instance, highway construction, or even closing of certain road stretches. To this end, traffic information made available, for instance, over the radio airwaves as a part of the Radio Data System (RDS) within a so-called Traffic Message Channel (TMC) and received by a radio receiver, can be evaluated by the navigation device 10.

It can further be provided, in accordance with the present invention, that further parameters can be entered for the route determination, for instance request for, elimination of, or limitations relating to a particular secondary transportation means, such as for instance, "no bus", "no local train", "no airplane", (thus, in the final analysis, just express trains), or the shortest possible distance to be traveled in the primary transportation means before reaching the transfer location;

request for certain details with respect to the secondary transportation means, such as for instance a high class of service, possibly ICE, night train with sleeping car accommodations;

input of an optimization criterion for the entire trip, such as the shortest possible travel time, as few transfers as possible, shortest possible waiting intervals (for instance during transfers between trains);

inputs concerning the infrastructure of the transfer location, for instance a sufficient number of parking spaces, at the transfer location, its equipment with certain shopping opportunities or services;

input of the threshold limit for the time reserve available at the transfer location between the arrival of the primary transportation means there and the departure of the secondary transportation means from there, which time reserve is needed for the orderly parking of the vehicle constituting the primary transportation means, possibly some shopping, and reaching and boarding the secondary transportation means in time.

Of course, to be able to take these parameters into account, the stored map in the first storage device 60 and/or the data stored in the second storage device 65 must contain the requisite information.

In an alternative to the automatic determination of the most suitable secondary transportation means and/or its most suitable departure point as the transfer location, it can be provided, also in accord with the present invention, that the secondary transportation means or its departure point be predetermined by the traveler and/or driver. In this case, the navigation computer calculates the travel route from the instantaneous location of the primary transportation means to the predetermined transfer location and indicates the available time reserve, either from the instantaneous position or location of the vehicle, or its prospective arrival at the transfer location prior to the departure of the secondary transportation means. For enhancing traffic safety, it can be provided here that, when the time reserve falls below the smallest possible value needed for an orderly parking of the vehicle and the reaching of the secondary transportation means from the parking location, it is not this particular (insufficient) time reserve that is indicated but rather that available prior to the departure of the next following secondary transportation means, for instance, to the departure of the next following train traveling to and making a stop at the same ultimate destination.

It will be understood that each of the elements described above, or two or more together, may also find a useful application in other types of constructions differing from the type described above.

While the present invention has been described and illustrated herein as embodied in specific construction of a navigation device for a private passenger car, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims:

What is claimed is:

1. A method of navigating a driver of a primary transportation means along a calculated route from a starting point to a destination by issuing appropriate travel advice, comprising the steps of:
    selecting a transfer location from the primary transportation means to a secondary transportation means traveling to an ultimate destination as said destination; and
    producing additional information, in addition to said travel advice, in dependence on known destinations of various ones of the secondary transportation means and departure times of various ones of the secondary transportation means from said transfer location and said starting point for use in at least one of bringing such additional information to the driver's attention and calculating the route.

2. The method as defined in claim 1, wherein said producing step includes determining said information in dependence on the ultimate destination entered by the driver.

3. The method as defined in claim 1, wherein said producing step includes generating an indication of the time available before the departure of the particular secondary transportation means from at least one of the present location of the primary transportation means and the prospective time or arrival of the primary transportation means at the transfer location.

4. The method as defined in claim 3, wherein said generating step includes issuing, in the event that said available time indication drops below a predetermined threshold, another indication of the time available before the departure of the next following secondary transportation means instead.

5. The method as defined in claim 1, wherein said selecting step includes using the additional information obtained in said producing step for determining the travel route to that of all possible transfer locations from which the secondary transportation means that arrives at the ultimate destination the soonest departs.

6. The method as defined in claim 1, wherein said selecting step includes using the additional information obtained in said producing step for determining the travel route to that of all possible transfer locations from which the secondary transportation means that arrives at the ultimate destination the soonest departs at a time no sooner than a predetermined time period after the prospective arrival of the primary transportation means at that transfer location.

7. The method as defined in claim 1, wherein said producing step includes retrieving departure times and ultimate destinations of the secondary transportation means from a storage.

8. The method as defined in claim 1, wherein said producing step includes obtaining departure times and ultimate destinations of the secondary transportation means from a data base over a wireless connection.

9. An arrangement for navigating a driver of a primary transportation means along a calculated route from a starting point to a destination by issuing appropriate travel advice, comprising:
    means for storing departure times from transfer locations from the primary transportation means to a secondary transportation means, and ultimate destinations to which such secondary transportation means travel; and
    navigation computing means for producing additional information in dependence on such stored departure times of various ones of the secondary transportation means from said transfer locations and ultimate destinations of various ones of the secondary transportation means and the starting point information for use in at least one of bringing such additional information to the driver's attention and calculating the route.

10. The arrangement as defined in claim 9; and further comprising means for receiving updated information from a remote location about the currently applicable ones of said departure times and ultimate destinations; and means for storing such updated information for use by said navigation computing means.

11. A method for calculating a route of transportation means in a navigation device, comprising the steps of:
    calculating said route of a primary transportation means from a first starting point to a transfer location, whereby said transfer location is a second starting point for secondary transportation means to an ultimate destination;
    producing information in dependence on known departure times and destinations of various ones of the secondary transportation means for use in calculating the route.

12. The method as defined in claim 11, wherein said information is brought to the attention of a driver of said transportation means.

13. The method as defined in claim 11, wherein said producing step includes determining said information in dependence on the ultimate destination entered by the driver.

14. The method as defined in claim 11, wherein said producing step includes generating an indication of the time available before the departure of the particular secondary transportation means from at least one of the present location of the primary transportation means and the prospective time or arrival of the primary transportation means at the transfer location.

15. The method as defined in claim 14, wherein said generating step includes issuing, in the event that said available time indication drops below a predetermined threshold, another indication of the time available before the departure of the next following secondary transportation means instead.

16. The method as defined in claim 11, wherein said calculating step includes using the information obtained in said producing step for determining the travel route to that of all possible transfer locations from which the secondary transportation means that arrives at the ultimate destination the soonest departs.

17. The method as defined in claim 11, wherein said calculating step includes using the additional information obtained in said producing step for determining the travel route to that of all possible transfer locations from which the secondary transportation means that arrives at the ultimate destination the soonest departs at a time no sooner than a predetermined time period after the prospective arrival of the primary transportation means at that transfer location.

18. The method as defined in claim 11, wherein said producing step includes retrieving departure times and ultimate destinations of the secondary transportation means from a storage.

19. The method as defined in claim 11, wherein said producing step includes obtaining departure times and ultimate destinations of the secondary transportation means from a data base over a wireless connection.

* * * * *